US008832247B2

(12) United States Patent
King et al.

(10) Patent No.: US 8,832,247 B2
(45) Date of Patent: Sep. 9, 2014

(54) METHODS AND SYSTEMS FOR CACHING CONTENT AT MULTIPLE LEVELS

(75) Inventors: Chris King, San Jose, CA (US); Steve Mullaney, Sunnyvale, CA (US); Jamshid Mahdavi, San Jose, CA (US); Ravikumar Venkata Duvvuri, Cupertino, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1357 days.

(21) Appl. No.: 11/690,669

(22) Filed: Mar. 23, 2007

(65) Prior Publication Data

US 2007/0245090 A1 Oct. 18, 2007

Related U.S. Application Data

(60) Provisional application No. 60/743,750, filed on Mar. 24, 2006.

(51) Int. Cl.
*G06F 15/16* (2006.01)
*G06F 15/173* (2006.01)
*G06F 12/00* (2006.01)
*H04L 29/08* (2006.01)
*G06F 12/08* (2006.01)

(52) U.S. Cl.
CPC ........ *G06F 12/0897* (2013.01); *G06F 12/0813* (2013.01); *H04L 67/2852* (2013.01); *G06F 12/0875* (2013.01); *H04L 67/28* (2013.01)
USPC .......................................... 709/223; 711/129

(58) Field of Classification Search
CPC . H04L 67/1097; H04L 67/1002; H04L 67/28; H04L 67/2852; G06F 12/0897; G06F 12/0813; G06F 12/0875
USPC .................................... 709/217–228; 711/129
See application file for complete search history.

(56) References Cited

U.S. PATENT DOCUMENTS

| 6,715,037 | B2 * | 3/2004 | Malcolm ........................ 711/119 |
| 7,308,683 | B2 * | 12/2007 | Johnson ........................ 717/158 |
| 7,543,146 | B1 * | 6/2009 | Karandikar et al. ........... 713/175 |
| 2003/0005228 | A1 * | 1/2003 | Wong et al. .................... 711/121 |
| 2003/0026254 | A1 * | 2/2003 | Sim ................................ 370/392 |
| 2003/0046369 | A1 * | 3/2003 | Sim et al. ....................... 709/220 |
| 2004/0054777 | A1 * | 3/2004 | Ackaouy et al. .............. 709/225 |
| 2005/0033803 | A1 * | 2/2005 | Vleet et al. .................... 709/203 |
| 2005/0066063 | A1 * | 3/2005 | Grigorovitch et al. ............. 710/1 |
| 2005/0120134 | A1 * | 6/2005 | Hubis .......................... 709/238 |
| 2006/0248276 | A1 * | 11/2006 | Kilian et al. .................. 711/130 |
| 2006/0248547 | A1 * | 11/2006 | Bockhold et al. ............. 719/330 |
| 2006/0294555 | A1 * | 12/2006 | Xie ................................. 725/88 |
| 2007/0156966 | A1 * | 7/2007 | Sundarrajan et al. ......... 711/133 |
| 2007/0186044 | A1 * | 8/2007 | Fowles ......................... 711/130 |
| 2008/0307268 | A1 * | 12/2008 | Azevedo et al. ................ 714/42 |

* cited by examiner

*Primary Examiner* — Haresh N Patel
(74) *Attorney, Agent, or Firm* — Ascenda Law Group, PC

(57) ABSTRACT

A cache includes an object cache layer and a byte cache layer, each configured to store information to storage devices included in the cache appliance. An application proxy layer may also be included. In addition, the object cache layer may be configured to identify content that should not be cached by the byte cache layer, which itself may be configured to compress contents of the object cache layer. In some cases the contents of the byte cache layer may be stored as objects within the object cache.

14 Claims, 6 Drawing Sheets

METHODS AND SYSTEMS FOR CACHING CONTENT AT MULTIPLE LEVELS

RELATED APPLICATION

This application is a nonprovisional of, claims priority to and incorporates by reference U.S. Provisional Patent Application 60/743,750 filed 24 Mar. 2006.

FIELD OF THE INVENTION

The present invention relates to systems and methods for caching within a network and, more specifically, to techniques for combining caching operations at multiple levels (e.g., object levels and byte levels) within a single appliance.

BACKGROUND

In the context of desktop applications (e.g. office software or web browsers), a cache is a device located logically between a content source (typically an application server or Web server though sometimes another cache) and one or more clients. Web pages, documents, images, movies, etc. (collectively known as "content") stored by these content sources may be downloaded and displayed by the clients. The content can be displayed in the context of a Web browser executing on the client platform, or in the context of other application programs (e.g., audio/video players, document viewers, image viewers, etc.).

The content distributed by the various content sources may contain a variety of "objects". In this context, the term object is used to refer to logical entities such as images or other multimedia data, such as animation, audio (such as streaming audio), movies, video (such as streaming video), program fragments, such as Java, Javascript, or ActiveX, or Web documents. Generally speaking, objects are relatively large logical entities.

As indicated above, a cache typically sits between the client and the content source and monitors transmissions therebetween. For example, if the client requests a Web page, the cache will see the request and check to see if it stores a local copy thereof. If so, the cache will return that copy to the client. Otherwise, the cache will forward the request to the content source. As the content source returns the requested objects to the client, the cache keeps a copy for itself, which copy may then be used to service later requests for the object. Application caches thus reduce latency (it takes less time for a client to get an object from a nearby cache than from the original content source); and reduce network traffic (because each object is only retrieved from the content source once, or periodically if the object is subject to changes over time).

The "object caching" discussed above is not the only form of caching available today. "Byte caching" or "stream caching" is an optimization technique in which information at a level below that of entire objects is cached. These cached bytes or streams are then associated with tokens so that when identical byte/stream patterns are observed in newly requested content, the byte/stream information is replaced by the token. Hence, if the byte/stream patterns repeat often enough, significant bandwidth savings can be achieved using these transmission optimizations.

SUMMARY OF THE INVENTION

An embodiment of the present invention provides a cache having an object cache layer and a byte cache layer, each configured to store information to storage devices included in the cache. Further, an application proxy layer configured to identify content that should not be cached by either (or both) of the object cache layer and/or the byte cache layer may also be included. For example, the application proxy layer may be configured to pass content not cacheable at the object cache layer to the byte cache layer.

The byte cache layer may be configured to compress contents of the object cache layer, and the object cache layer may be configured to enable or disable compression at the byte cache layer based on whether content is known to be compressible or not compressible (e.g., as determined by the application proxy layer). The contents of the byte cache layer may be stored as objects within the object cache.

A further embodiment of the invention involves receiving content from a content source and caching said content first at an object cache layer of a cache and next at a byte cache layer of the cache so as to eliminate repeated strings present within the content after caching at the object cache layer. Prior to caching the content at the object cache layer, the content may be transformed from a first format to a second format, for example from an encrypted data format to a decrypted data format. Alternatively, or in addition, prior to caching the content at the object cache layer, the content may be examined for compliance with one or more policies, for example policy checks performed remotely from the cache.

Prior to compressing the content at the byte cache layer, the content may be transformed from a first format to a second format. Further, intra-stream compression of the output of the byte cache layer may be employed. Indeed, the intra-stream compressed output of the byte cache layer may also be transformed from one data format to another data format, for example from an unencrypted data format to an encrypted data format.

Another embodiment of the present invention involves receiving content from a content source, decompressing the content at a byte cache layer to produce expanded content, and transmitting the expanded content to a client along with previously cached objects from an object cache layer. The byte cache layer and the object cache layer are preferably included in a common cache. Moreover, the expanded content may be cached at the object cache layer. Prior to decompressing the content at the byte cache layer, the content may be transformed from a first data format to a second data format, for example from an encrypted (and/or compressed) data format to a decrypted (and/or decompressed) data format.

Still another embodiment of the present invention provides a system that includes a first object cache communicatively coupled to a second object cache via a transport and signaling channel made up of reciprocal byte cache layers. An application proxy layer may be distributed between platforms supporting the first and second object cache. In some cases, the first object cache may be instantiated in a cache appliance, while in other cases the first object cache may be instantiated as a thin client executing on a computer platform.

In various embodiments of the invention, policy-based decisions are implemented at an application proxy layer associated with one or more of the first object cache and the second object cache. These policy-based decisions may be based on configured policy information, heuristics or other algorithms, and may include decisions concerning what information is or is not cached at the reciprocal byte cache level. For example, the policy-based decisions may include decisions concerning personally identifying information of a user.

The byte cache layers may be configured to compress and decompress contents of at least one of the object caches and may include a thinning mechanism whereby less popular data stored in the byte cache layers are removed over time. The byte cache layers may also be configured to store byte patterns of only less than a threshold size.

Yet a further embodiment of the invention provides a cache made up of a multi-level caching architecture in which content received from a content source is cached at multiple protocol stack levels according to its cacheability at each such layer. The byte cache layers of each of the first and second cache may store common strings with their respective tokens.

BRIEF DESCRIPTION OF THE DRAWINGS

The present invention is illustrated by way of example, and not limitation, in the figures of the accompanying drawings in which.

DETAILED DESCRIPTION

Figure 1:
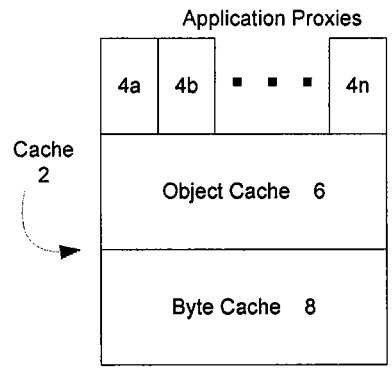
FIG. 1 illustrates a cache configured with an application proxy layer, an object cache layer and a byte cache layer in accordance with an embodiment of the present invention.

Described herein are methods and systems for caching content at multiple levels. Such techniques are useful in a variety of contexts, for example in accelerating traffic over bandwidth-constrained communication links. Inasmuch as many software applications are used in locations remote from where the applications are hosted, such acceleration can greatly improve application performance by reducing or eliminating latency issues.

In one embodiment of the present invention, a single cache combines one or more application proxies, an object cache layer and a byte cache layer. In this context, the application proxies are logical entities that understand the protocols over which the application objects are communicated or delivered (e.g., HTTP, HTTPS, CIFS, FTP, RTSP/RTP, etc.). Consequently, these application proxies can identify application object boundaries and make use of the object cache accordingly. Where the application objects are not cacheable, the application proxy can still take advantage of the byte cache (e.g., through custom or socket pair application programming interfaces) so that content which cannot or should not be cached at the object level may instead be cached at the byte or stream level. By doing so the present invention provides the benefits of application-level object caching, including the ability to offload demand on content sources and minimizing latency for cache hits, as well as the benefits of byte caching, to reduce the amount of data which must be transferred over a communication path. Byte caching can also offer benefits with respect to certain types of otherwise non-cacheable content, which an application-level cache can usually do little to accelerate. In addition, the appliance may incorporate further optimization techniques, such as intra-stream compression, predictive caching and policy-based content filtering.

Although discussed with reference to several illustrated embodiments, it is important to remember that the present invention should not be restricted thereby. That is, the scope of the invention is not intended to be limited to the examples presented below. Instead, the invention should only be measured in terms of the claims, which follow this description.

Moreover, various embodiments of the present invention may be implemented with the aid of computer-implemented processes or methods (a.k.a. programs or routines) that may be rendered in any computer software language including, without limitation, C#, C/C++, Fortran, COBOL, PASCAL, assembly language, markup languages (e.g., HTML, SGML, XML, VOXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored (permanently or temporarily, e.g., in the case of a client downloaded on-demand) in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics (e.g., mobile phones and the like), DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

Referring now to FIG. 1, a hierarchical view of a cache 2 configured according to an embodiment of the present invention is illustrated. Cache 2 may be embodied within a stand alone appliance or, in some cases, may be instantiated (at least in part) as a client (or thin client) hosted on a personal computer or a server. Cache 2 includes one or more application proxies 4a-4n, an object cache layer 6 and a byte cache layer 8.

Object cache layer 6 provides for storage of application objects. In response to a request by a client for an object (e.g., a file, document, image, etc.) cache 2 intercepts the request and checks to see if it has a fresh copy of the requested object. If so, cache 2 responds by sending the cached object to the client, otherwise it relays the request to another content source (e.g., a server identified by or in response to the client's request). The response from the server is then cached for future requests from clients.

Such application-level or object caches are generally used to offload the burden on origin servers and other content sources and to improve the time required to deliver requested content to clients. Object caches are sometimes referred to as application-level caches because they terminate application-level communications. In the present invention, however, the termination of the application-level communications is preferably handled by the application proxies 4a-4n. This allows for protocol-by-protocol optimization to remove application-specific protocol deficiencies, such as the chattiness of the protocol (e.g., as occurs with MAPI and CIFS), sequencing of messages, the frequency of short messages, etc. Moreover, in cases where application-level objects may not be cacheable an application proxy may still be able to offer other services to enhance the delivery of data through the network.

Byte cache (or stream cache) 8, on the other hand, operates at a much lower communication level (e.g., typically the Internet protocol (IP) or transmission control protocol (TCP) level) to store individual segments of data in a process called "dictionary compression". When data segments are repeated on a communication link these byte or stream dictionaries can be used to replace the actual data with representative tokens, thus reducing the size of information block (more specifically the number of bytes) to be transmitted. A more detailed discussion of byte caching can be found in Neil T. Spring and David Wetherall, "A Protocol Independent Technique for Eliminating Redundant Network Traffic", Proc. ACM SIG-COMM (August, 2000), incorporated herein by reference.

Byte caching caches traffic irrespective of application-level protocol, port, or IP address, on both ends of a WAN link. Each time data needs to be sent over the WAN link, it is scanned for duplicate segments in the cache. If any duplicates are found, the duplicate data (e.g., in some embodiments up to 64 KB), is removed from the byte sequence, and a token and a reference to the cache location and length is inserted (e.g., in one embodiment this is a 14-byte package). On the receiving end, the token and the reference are removed from the byte sequence and original data is inserted by reading from the byte cache, thus creating a byte sequence identical to the original byte sequence.

In some cases, the object cache layer 6 enables or disables compression at the byte cache layer on whether content is known to be compressible or not compressible. Such determinations may be made at the application proxy layer. In some cases, for example a split proxy configuration, the application proxy layer may be distributed between two different platforms supporting reciprocal object cache layers. This allows for improved efficiency of the application proxy while still obtaining the benefits of the byte caching channel between the split proxies.

By combining both object and byte caching techniques in a single cache, the present invention is able to combine the benefits of each, resulting in acceleration of enterprise applications and reduction of WAN bandwidth requirements. For example, while object caching alone offers a number of benefits (such as server offload and reduced latency), it fails to accelerate content delivery on cache misses and when dealing with non-cacheable content. Moreover, because object caching is application specific it cannot be used with all communication protocols. Combining object caching with byte caching ameliorates these shortcomings. For example, byte caching operates with any communication protocol, is able to handle caching of dynamic and other types of otherwise non-cacheable content, and can be effective across different protocols (e.g., byte caching will operate even if the same file were first downloaded via the Common Internet File System (CIFS) and later via the Hypertext Transfer Protocol (HTTP)).

Likewise, shortcomings of byte caching (for example, its inability to offload demand on a content source or cache application-level decisions of other, associated routines) can be solved (at least in part) through combination with an object cache. For example, an object cache allows for true server offload and is able to cache decisions of external processes, which can later eliminate the need to repeat these time-consuming operations. Such external processes may include virus scanning, examining content for compliance with network or business policies, and so on. The results of such policy evaluations may also be cached for later evaluation or use. In this way, object caches can be used to enforce various types of content policies, for example allowing some content to pass to a requesting client while denying other requests.

In addition to providing object-level and byte-level caching, caches configured in accordance with embodiments of the present invention may also provide "intra-stream compression" using conventional data compression technologies (e.g., Gzip). That is, within a single stream short histories thereof may be cached and used to eliminate redundant data. Typically, such technologies cannot operate across stream boundaries and so are distinct from byte caching as that term is used in connection with the present invention.

Caches (whether appliances or otherwise) configured in accordance with embodiments of the present invention may also provide "predictive caching". Caches configured in this manner examine content (e.g., HTML content as found in Web pages) being returned in response to a client request and identify embedded documents included therein. These embedded documents are then fetched and cached before the client's browser actually requests them (i.e., on the prediction that they will be needed). Techniques for performing such actions are discussed in U.S. Pat. No. 6,442,651, assigned to the assignee of the present invention and incorporated herein by reference. Such actions reduce the overall latency of a request.

Other predictive caching operations may make use of a content delivery network (CDN) for distributing content to caches on a schedule, ahead of points in time when a client will request such content. In a CDN, the administrator or end user may have more specific control over how and when a cache is pre-populated with content in order to most effectively speed up later accesses. CDN techniques may be used in conjunction with an object cache, byte cache, or both.

Still another technique for predictive caching is "read ahead". CIFS and MAPI (messaging application programming interface) downloads the cache may be configured to "read ahead" request later blocks in a file/message before the client requests same. All of these forms of predictive caching can be combined with object caching and byte caching in order to improve the performance of these techniques in accordance with embodiments of the present invention. For example, in the case of HTTP, streaming content and CIFS, predictive caching may be used to store objects in the object-level cache, while in the case of MAPI, the read ahead may be used to populate the byte-level cache.

Figure 2A:
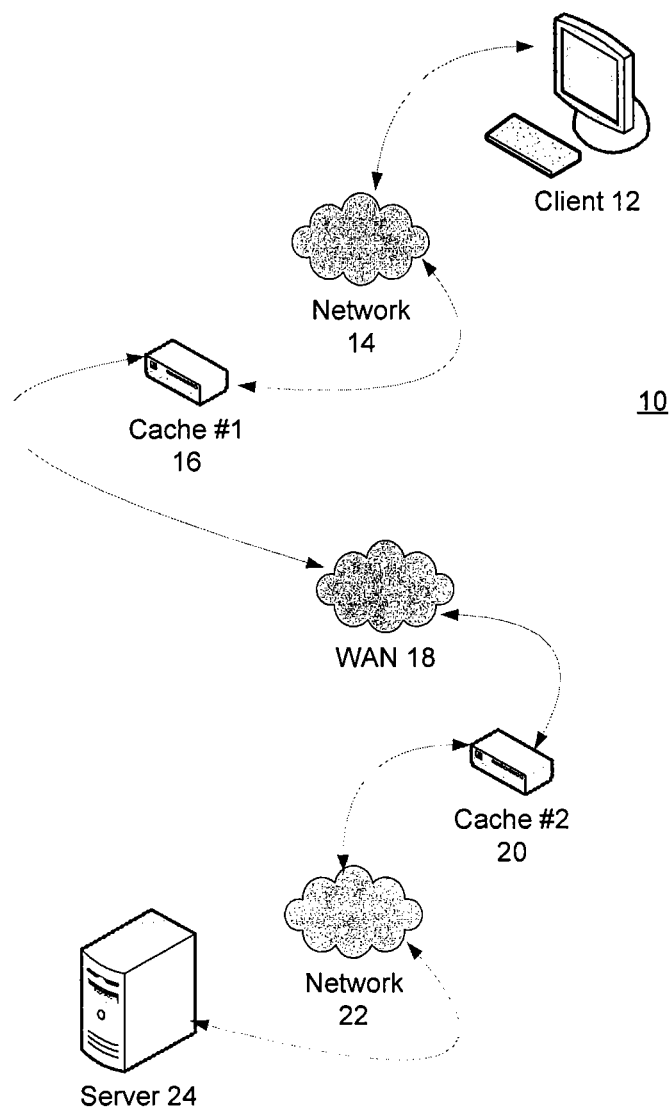
FIGS. 2A-2D illustrate various computer systems having pairs of caches each configured with object cache layers and byte cache layers in accordance with an embodiment of the present invention.
Figure 2B:
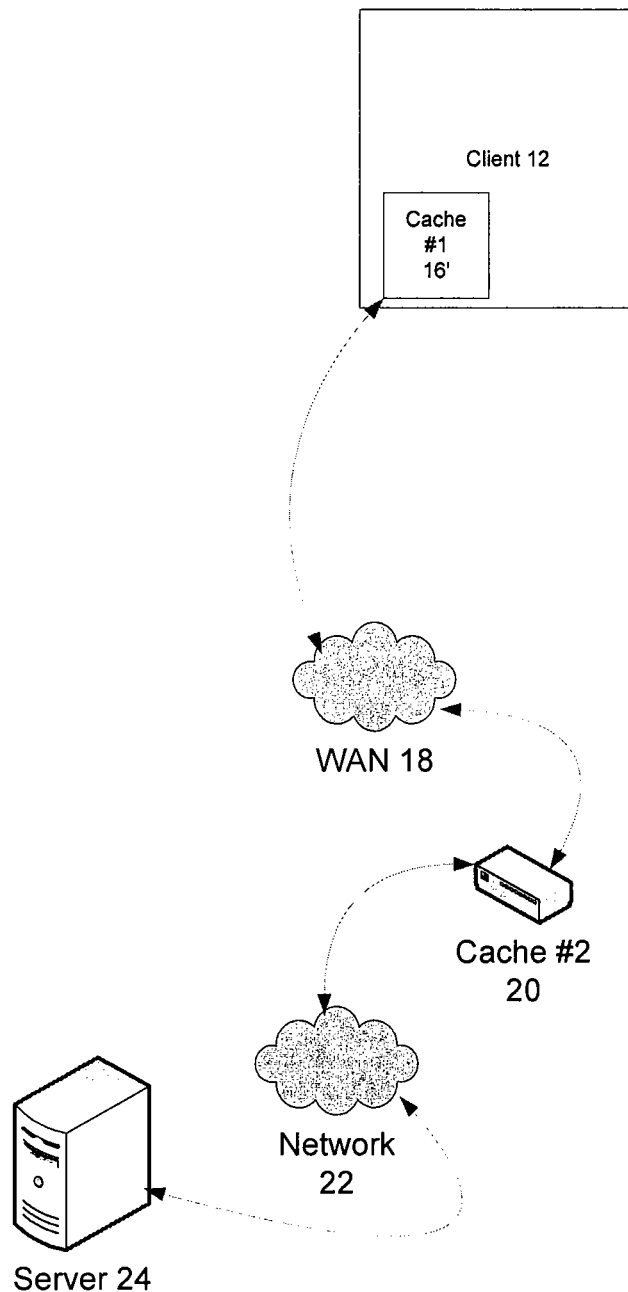

Having thus described some of the advantages offered by the present invention, we turn now to a description of the operation of various embodiments thereof. Referring to FIG. 2A, a system 10 includes a client 12 communicatively coupled via a network 14 to a cache 16 that is configured in accordance with the present invention. Network 14 may be a local area network or, in some cases, may be a point-to-point connection, such as an Ethernet connection. In other cases, as shown in FIG. 2B, network 14 may be omitted altogether and functionality performed by cache 16' may be instantiated within client 12, for example as a proxy cache of a Web browser application or another application (e.g., a thin client) executing on client 12. For clarity, however, it is easier to treat cache 16 as a separate appliance in the remaining discussion.

Returning to FIG. 2A, cache 16 is communicatively coupled through a wide area network 18 to a second cache 20. Network 18 may be a single network or a network of networks, such as the Internet. In some cases, network 18 may be a private network (including, for example, a virtual private network established within a public network). Although not shown in this illustration, cache 16 may be communicatively coupled to cache 20 through a multitude of routers, switches, and/or other network communication devices. The details of such communication paths are not critical to the present invention and so they are represented simply as network 18. Likewise, in some cases the caches 16 and 20 may be communicatively coupled through one or more gateways and/or firewalls, but these details are not critical to the present invention and so are not shown in detail.

Figure 2C:
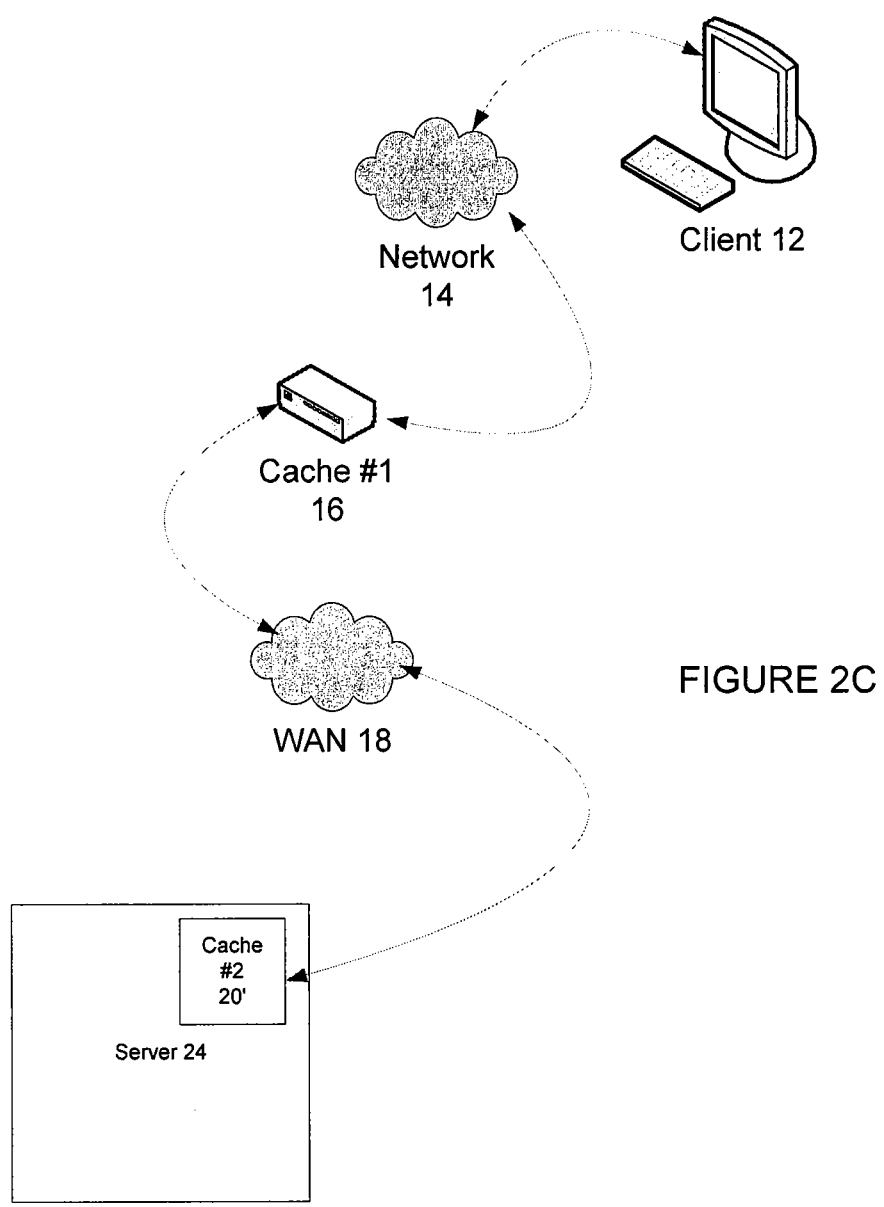
Figure 2D:
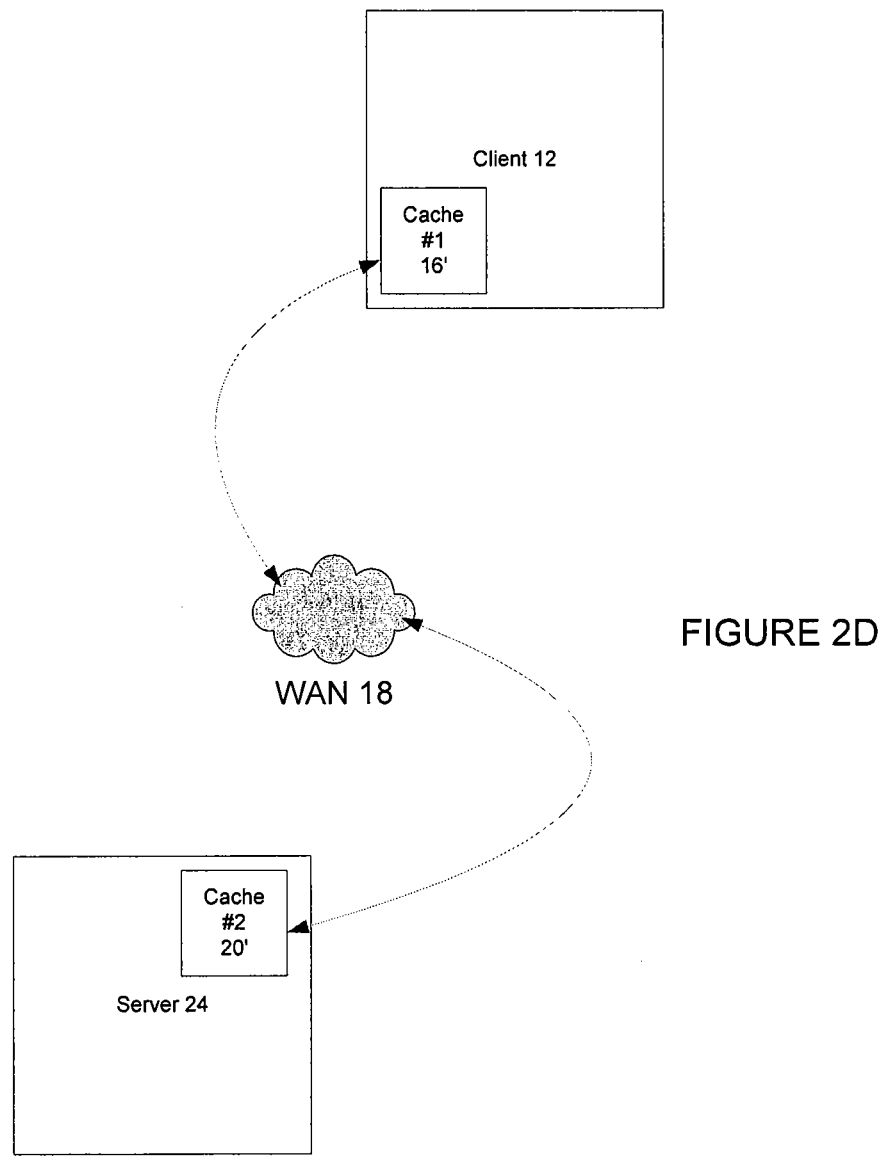

Cache 20 is communicatively coupled via network 22 to a server (or other content source) 24. As was the case with network 14, network 22 may be a local area network or, in some cases, may be a point-to-point connection, such as an Ethernet connection. In other cases, for example as shown in FIG. 2C, network 22 may be omitted altogether and functionality performed by cache 20' may be instantiated within server 24, for example as a proxy cache of a Web server application or other application executing on server 24. For sake of completeness, FIG. 2D shows an example where each cache component is instantiated as an application (e.g. a thin client), with one executing on the client 12 and the other on server 24. Of course having a cache application 20' executing on server 24 may, in some cases, be somewhat redundant but in other cases it provides significant advantages. For example, where the server itself needs to consult other data sources in order to respond to client requests, having such a cache may be particularly advantageous.

As used herein, the terms "client" and "server" refer to relationships between various computer-based devices, not necessarily to particular physical devices. A "client" or "server" can include any of the following: (a) a single physical device capable of executing software which bears a client or server relationship with respect to a cache; (b) a portion of a physical device, such as a software process or set of software processes capable of executing on a physical device, which portion of the physical device bears a client or server relationship to a cache; or (c) a plurality of physical devices, or portions thereof, capable of cooperating to form a logical entity which bears a client or server relationship to a cache. The phrases "client" and "server" therefore refer to such logical entities and not necessarily to particular physical devices. Further, in any of the embodiments described herein, either or both of networks 14 and 22 could be local area networks, wide area networks, or other more complicated networks, such as the Internet. Likewise, network 18 could be a wide area network or a local area network. One common scenario would have network 18 being a corporate intranet and network 22 being the Internet.

For purposes of understanding functions performed by caches 16 and 20 (or 16' and/or 20') the example below assumes that client 12 has made a request for content from server 24. Of course, the reverse process, where the client is sending data to the server would implicate somewhat reverse functionality (i.e., cache #1 and cache #2 may perform similar operations in the reverse data flow direction). One difference that would be apparent in the reverse data flow direction is that one could cache "write" operations (say, for CIFS). The caching of a write operation is somewhat different than a read. Data stored on a cached read is generally used by subsequent read operations. For a cached write, the data is not used by subsequent writes but rather by subsequent reads. One significant benefit of the present invention is the ability to cache CIFS writes.

Figure 3:
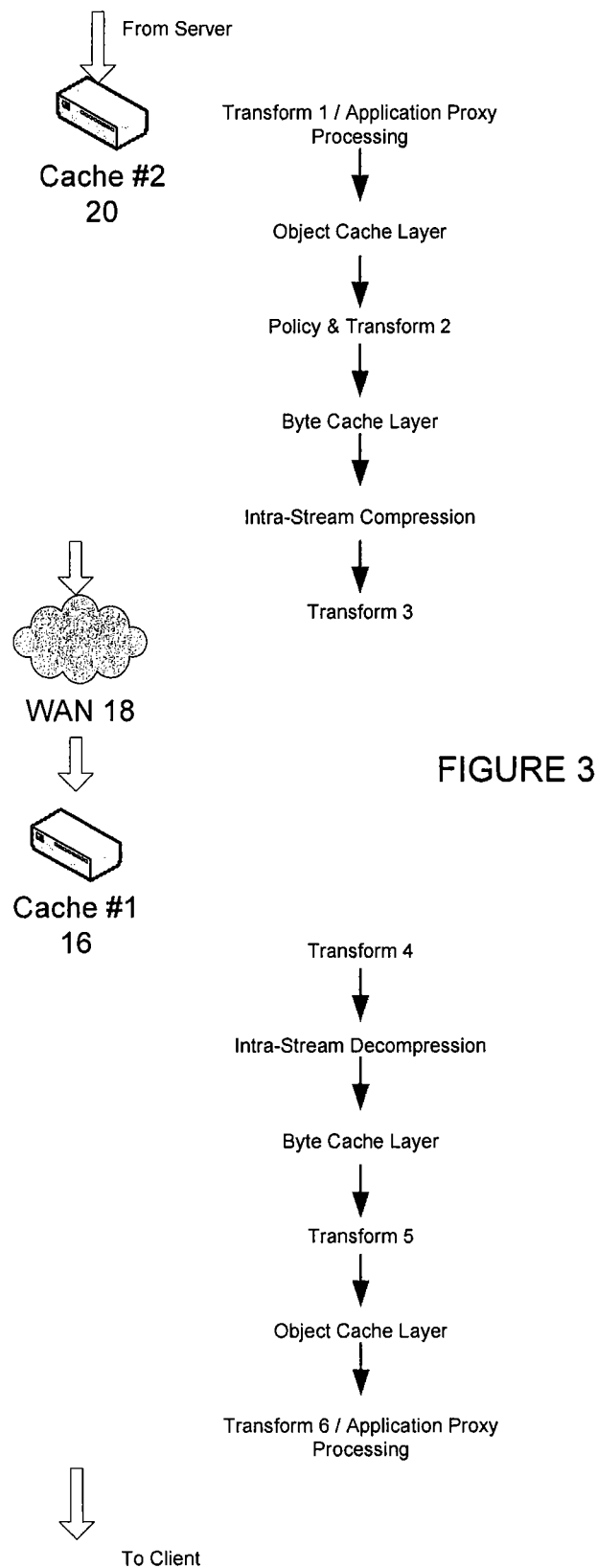
FIG. 3 illustrates in further detail operations performed at the various caching layers of the caches illustrated in FIGS. 2A-2D.

Returning to the read example, as the requested content is returned, it arrives first at cache 20. Depending on the type of session between client 12 and server 24 and the type and nature of the content being transferred, any one or more of the following operations, illustrated in FIG. 3, may be performed.

a. Transform (1)/Application Proxy layer: This is a data transformation process in which encrypted content (e.g., as part of a SSL session) may be decrypted for further processing within cache 20. Alternatively, or in addition, content that arrives in a compressed form may be decompressed for further processing. Other types of application-level transforms may also be employed (e.g., at the application proxy level). For example, HTTP content may arrive with "chunked encoding". A transformation may be performed (e.g., by the HTTP application proxy associated with cache 20) to restore the data to its original form before further processing is done. Application level proxies are especially well suited for such roles where examining and reassembling content into its correct form is required before further caching/compression operations may be undertaken. Likewise, the server could deliver the content in an encoded fashion (e.g., GZip encoding). An associated application proxy may be used to decode the content prior to further processing.

b. Policy-based operations (1): Prior to any actual caching of content at cache 20, the content may be scrutinized for compliance with one or more policies enforced by cache 20. For example, virus scanning may be performed at this time to ensure that the content is virus free before it is cached. Such scanning may be done by cache 20 or may be done by other resources not illustrated in the drawing and the results reported to cache 20.

c. Object-level caching: This is optional and in some embodiments may not be performed at the first cache. That is, in some embodiments the content will be subject to only the application proxy processing and byte caching. To the extent application (or object)-level caching is performed on the content, cacheable objects are copied into the object cache portion of cache 20. Also, to the extent there were any previously cached objects that satisfy the client's original request (which objects were not already present in the cache closest to the client), those objects may be served out of the object cache portion of cache 20 (note that the request for these objects may not have been forwarded to server 24, although a check may be made to determine whether or not the objects had been updated since last being cached and, if so, new copies thereof may have been requested).

d. Policy and transformation operations (2): Again, this is an optional procedure for the first cache in the content delivery path and in some cases is performed only at the cache closest to the client. Further policy-based operations and/or data transformation operations may be performed on the data not cached at the object cache level. Examples of such operations may include rewriting of Web pages to conform to a network operator's policies, stripping Java-based or other active content, etc. Even if the object is served from the cache, one may choose to have policy-based operations and data transformations performed.

e. Byte cache compression: At this point byte/stream caching may be employed to replace any previously cached strings with their respective tokens. Previously uncached strings may also be added to the byte cache layer of cache 20 at this time. That is, the strings may be cached in the byte cache layer and the byte cache table updated to reflect their availability along with their newly assigned, respective tokens.

f. Intra-stream compression: To the extent possible (and if desired), data redundancies may be reduced or eliminated using commercially available intra-stream compression routines. Examples of such operations include run length encoding, or more complex operations as performed by commercially available software tools such as Zlib, zip (including Gzip, PKZip, etc.), LZ adaptive dictionary-based algorithms, etc. This may be applied to some or all of the data resulting from the previous step.

g. Transformation (3): This final data transformation stage is optional. In cases where the client-server communications are to be encrypted, this transformation may involve encrypting the new data stream (produced after the caching and compression operations described above) according to the selected encryption algorithm or, in some cases, a new encryption scheme known only to caches 16 and 20.

The output data stream from cache 20 is transmitted across network 18 to cache 16, where some or all of the following operations may be performed:

a. Transformation (4): This data transformation operation will, in many cases, be an inverse of the Transformation (3) operation performed by cache 20. For example, if cache 20 performed an encryption operation, cache 16 will need to decrypt the data prior to processing it further. Other transformation operations that may be performed at this stage may not be perfect inverse operations of procedures applied at cache 20.

b. Intra-stream decompression: If intra-stream compression was performed by cache 20, cache 16 will need to perform inverse operations at this stage to expand the compressed data before it can be further processed. Generally, the intra-stream compression operation as a whole must be lossless. That is, the entirety of the data stream must be recoverable by cache 16.

c. Byte cache decompression: At this stage of processing, the tokens representing data streams replaced during the byte cache operations of cache 20 are themselves replaced by the corresponding data streams out of the byte cache layer of cache 16. In addition, any new streams cached in the byte cache layer of cache 20 will also be cached to the byte cache layer of cache 16 (and corresponding tokens assigned) so that the byte cache layers of each of the caches 16 and 20 remain identical. This ensures that the newly cached information can be properly tokenized for transfer between the caches in the future.

d. Policy and transformation operations (5): At this stage, policy-based operations not performed at cache 20 may be performed by cache 16 in order to reflect local network policies. Layering of policies (some by cache 20 and others by cache 16) in this fashion may include such things as cache 20 performing rewrites based on access methods (say, converting HTTP URLs to HTTPs URLs) and cache 16 performing additional rewrites based on local policies (say, translating to a local language). In addition, inverse data transformation operations to those applied at transformation (2) in cache 20 may be performed, if such operations have an inverse.

e. Object-level caching: At this stage the object cache of cache 16 may supply any previously cached objects implicated by the client's original request (such requests would not necessarily have been passed upstream to the server 24). In addition, new objects may be stored to the object cache layer so as to be available to service later requests from client 12 or other requesters.

f. Transform (6)/Application Proxy layer: Again, this process may involve additive policy operations to apply local content or network policies at cache 16. In some cases, a data transformation process which is an inverse of the Transformation (1) process performed by cache 20 may also be applied. For example, the data stream may be encrypted (e.g., as part of a SSL session) prior to transmission to client 12. Alternatively, or in addition, the data stream may be compressed prior to such transmission. Of course, the transformation need not be an inverse of the Transformation (1) process and instead may be an encryption and/or compression operation (or other data transformation process) that had no equivalent operation at cache 20.

Note that at the various policy/transformation stages complex, remote operations such as virus scanning and URL filtering may be performed. That is, some of these network policies may be implemented by transferring the content (or portions thereof) to other devices responsible for such things as virus scanning, filtering or other operations and returning the results and/or filtered content to the cache. The precise nature of such operations are not critical to the present invention but the present invention does accommodate the use thereof. Also, socketpairs may (but need not) be used for communications between object cache and byte cache layers of a single cache appliance. Sockets typically define the communication paths to/from a network but in this case a pair of sockets are used to define communications between the various cache layers of a cache appliance. Socketpairs provide a convenient method to optionally insert processing layers without changing the input/output structure of application proxy code, and thus are beneficial for fast and error-free implementation of the techniques described herein.

It is not necessary that all of the data transforms or policy operations performed at the first cache be reversed at the second cache. In many cases, especially where policy operations are applied at both caches, the operations will be additive. That is, different policy operations will be performed. Also, at the second cache (that is the one closest to the requestor), previously cached objects may be added to the output of the byte cache layer. Indeed, that output of the byte cache layer may itself be cached at the object cache layer of the cache closest to the requester (if application level objects can be identified in that output) so as to have such objects available for later requests.

Achieving the best possible performance from a byte cache can be difficult from an implementation standpoint. In the context of the present invention, however, the task is made easier because of the presence of the application layer or cache functionality. Specifically, the application layer cache may be configured to identify portions of a stream which are "uninteresting" for byte caching. In one embodiment, for example, a hinting mechanism may be used to allow the application layer cache to identify "protocol metadata" which should not be stored in the byte cache. This metadata is not likely to be repeated in a subsequent transmission of the same file, because it is protocol specific and may even be specific to a single transmission/connection. By using this hinting mechanism to identify the material which should not be cached, the overall operation of the byte cache layer is improved.

Other "policy-based" decisions (e.g., decisions taken at the application proxy level based on configured policy information, heuristics or other algorithms, such as string matches, executed on the received content) that determine what information is or is not cached at the byte cache level may concern "sensitive" information. For example, personally identifying information of a user may be determined to be non-cacheable (even at the byte cache level) for policy reasons. The object level cache may be configured to mark such non-cacheable content so that it is not cached at the byte cache level. Such operations are not feasible with conventional byte caches because such devices have no ability to determine the nature of the information being transmitted thereto.

The performance of the various cache layers is also affected by contention for limited resources in the single cache appliance. For example, both the object cache and the byte cache require and utilize memory and disk resources. That is, a cache configured in accordance with the present invention may include both short-term storage (typically in the form of read/write memory) and longer-term storage (typically in the form of one or more hard disk dives which may be read from/written to). Information received at the cache is usually first stored to memory and later transferred to disk (assuming it is to be preserved for a longer period). One reason for this division of storage is that it typically takes longer to read from/write to disk than to/from memory and so in order to avoid losses of data due to read/write latencies, this two level storage technique is employed. Of course, the optional intra-stream compression layer also requires memory resources if it is used. These contention issues may be addressed in a variety of ways.

For example, in one embodiment of the present invention, content (i.e., data bytes) may be stored on disk both within the object cache layer and within the byte cache layer. This may (and often will) mean that the same information is stored twice. This is not necessarily a problem inasmuch as disks tend to be large (in terms of storage space) and relatively inexpensive. Nevertheless, the situation can be improved by using the byte cache to "compress" the contents of the object cache. This would allow information stored in the object cache layer to be much reduced in size when stored to disk.

Unlike disk space, however, memory remains relatively expensive per unit volume and so memory within the cache appliance is a precious resource. At the same time, intra-stream compression requires that large amounts of memory be allocated to so-called "stream contexts"; sets of parameters and stream specific options that modify or enhance the behavior of a stream. In order to optimize the use of memory for such stream contexts, one embodiment of the present invention stores a limited number of these contexts and re-uses them across multiple streams by migrating the contexts from one stream to the next. Further, in some cases a compression operation may be omitted where the data is determined to be poorly compressible (either by the application proxy determining same, or because the cache has computed the compression rate or factor during compression operations and determined that it does not meet a previously established threshold). This can not only save memory, but also improve CPU performance. Also, one may choose to migrate the compression contexts to disk during periods when they are not in use in order to save memory.

Of course, memory is also needed by the object cache layer (e.g., to store an object hash table and memory cache) and the byte cache layer (e.g., to store a fingerprint table that acts as an index into the byte cache). To accommodate these needs, in one embodiment of the present invention the actual byte cache data is stored as a set of objects within the object cache, so the memory cache provided by the object cache layer is effectively used for both object cache data and byte cache data. In some cases it may be necessary to store the object hash table (or a portion thereof) on disk in order to free up more memory space for the byte cache fingerprint table.

In some cases a "thinning" mechanism may be employed in order to further optimize the memory space allocated to the data cache's fingerprint table. For example, for less popular data stored by the byte cache the associated entries in the fingerprint table for may be thinned (i.e., removed) over time. The consequence of course is that more fingerprint entries are kept for popular byte streams and, therefore, searches of the byte cache are more likely to find matches. The net result is improved compression ratios overall. Similar techniques may be used at the object cache level, for example by employing a "least recently used" other form of cache clean up mechanism.

In yet a further aspect of the present invention, a "split proxy" may be implemented. In some embodiments of the present invention the object cache layers at each of cache 16 and cache 20 may store all cacheable objects returned by the content source. For example, this may be required where the caches need to operate independently of one another when servicing some client requests. However, it is also possible to configure the two object cache layers to operate as two halves of the same object cache that just happen to be executing on different devices.

The split proxy concept allows some objects to be stored at cache 20 and other objects to be stored at cache 16. The byte caching layer is then used as a transport and signaling channel between the two halves. The most basic signaling done on this byte caching channel would be to detect that there is an "other half" and agree to operate in split proxy mode. Thereafter the two object caches may communicate with one another to decide which will store what objects as they are returned from content sources and also to determine whether one of the halves has a copy of a requested object that can be used to satisfy a current request.

A split proxy also allows for the processing, rather than just the storage, to be split. For some application protocols it may be advantageous to perform certain parts of the processing closest to the server, even though all of the data is ultimately cached at the object level at the cache closest to the client. For example, in the case of read ahead operations, the cache closest to the server may be tasked with all of the read ahead operations and all of the data may be sent in a more efficient form to the cache closest to the client, where protocol-based processing and other optimizations are performed. This may include the most efficient form for sending the data without certain overhead that would otherwise be imposed by application layer protocols. In this form, the data is still subject to the benefits of byte caching and, indeed, may be more "byte cacheable".

A further optimization of the present invention concerns the sizes for various byte caching parameters. That is, in order to keep the size of the byte cache (i.e., the amount of memory and disk space that it consumes) to a manageable level, it is not feasible to cache every possible byte pattern observed during a communication session. At the same time, if the cached streams are too fragmented, long matches are prohibited and the efficiency of the cache will be reduced. To balance these competing interests, one embodiment of the present invention provides for a threshold. For hits of length below the threshold they will be included in the byte cache for future use (avoiding fragmenting the stream). For hits longer than the threshold, however, they will not be included in order to avoid the byte cache becoming too large. In some cases, application-level information may be used/evaluated in order to set the appropriate threshold.

Different applications may have very different data characteristics. Even within a particular application, different files or request types may have different characteristics. For example, some applications and even particular types of files may have common byte patterns which are very long, while others may have much shorter common byte patterns. For this reason, individual application proxies may wish to control certain parameters related to byte caching in order to optimally store and find content in the byte cache. For applications or file types where repeated byte patterns are long, the application may wish to increase the threshold described in the previous paragraph. For applications or file types where the repeated byte patterns are always expected to be short, it may be desirable to decrease or even eliminate the threshold described in the previous paragraph. In addition, such applications or file types may also wish to have the byte cache produce more frequent index data in order to increase the likelihood of finding smaller repeated patterns. This indexing is normally done by performing a computation on a small set of bytes (sometimes called a "shingle"); the length of the shingle is a lower bound on the size of repeated data which can be detected. For applications or file types which are expected to have very short repeated patterns, it may also be necessary to decrease the shingle size used when storing data of this type into the byte cache. In one embodiment of the invention, application proxies consider the protocol, file type, and other characteristics of the data, and choose optimal parameters for storing and retrieving that data within the byte cache.

Thus, methods and systems for caching content at multiple levels have been described. In the foregoing description reference was made to various illustrated embodiments of the invention, but the invention should not be limited thereby. For example, notwithstanding anything described above the present invention is applicable to caching at any or all of a variety of layers, including but not limited to an IP layer, a TCP layer, an application layer, and/or layer 2. Moreover, a cache configured in accordance with the present invention may act as a read-write cache for byte caching and also for some application level proxies such as CIFS, etc. In some cases, the byte cache layer may in fact be a multi-level byte cache, in which different parameters are used for indexing each level. For example, a very large cache may have relatively sparse indexing information, while smaller caches may include more dense indexing information. By combining the two the byte caching portion of a cache appliance configured in accordance with the present invention may be optimized.

Figure 4:
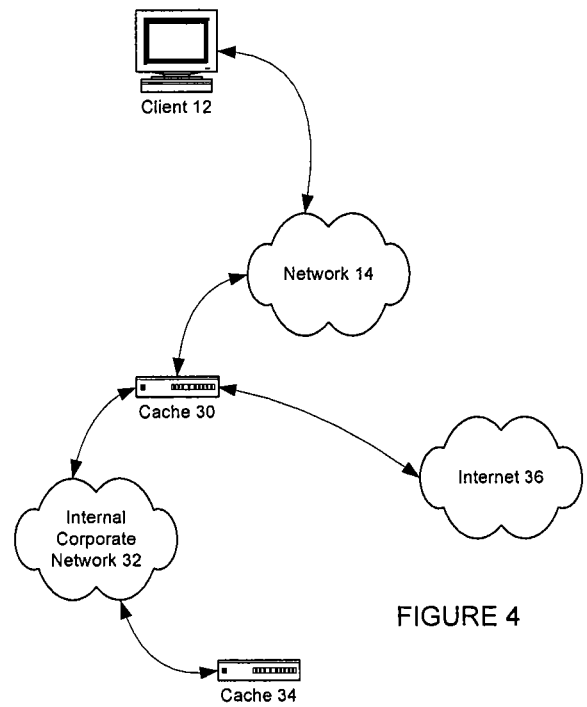
FIG. 4 illustrates a split tunnel deployment of caches configured in accordance with embodiments of the present invention.

In yet another embodiment, illustrated in FIG. 4, a cache 30 configured in accordance with the present invention may be deployed in a "split tunnel" configuration. Here, client 12 connects to cache 30, which is situated at an Internet gateway of a corporate LAN, via network 14. As before, one port of cache 30 may be coupled to further elements of the corporate network 32 (e.g., including a reciprocal cache 34 that provides object and byte cache layers, servers, other clients, etc.). Another port of cache 30 is directly connected to the Internet (or other external network) 36. As such, on that communication link only the object cache layer (and perhaps the application proxies) of cache 30 would provide benefit inasmuch as there is no reciprocal byte cache layer to peer with. Nevertheless, certain application accelerations (i.e., those that benefit from object caching) could still benefit from this object cache layer and applications accessed over the corporate network 32 could still make use of both the object cache and byte cache layers.

Thus, in light of these and other variations which may be implemented, the present invention should be measured only in terms of the claims, which follow.

What is claimed is:

1. A system comprising:
a first object cache operating in a memory of a first apparatus in communication with a second object cache operating in a memory of a second apparatus via a transport and signaling channel comprising a reciprocal byte cache layer for the first apparatus cache and a reciprocal byte cache layer for the second apparatus cache,
wherein,
the reciprocal byte cache layers of the first and the second apparatuses are used by each of the respective first object cache and second object cache to communicate with one another to decide which cache will store various network traffic, the caching of network traffic being independent of an application protocol and an object level protocol,
policy-based decisions are implemented at an application proxy layer associated with one or more of the first object cache and the second object cache, and
the first object cache and the second object cache operate as a single cache that split processing and storage of objects between the first and the second object caches.

2. The system of claim 1, further comprising an application proxy layer distributed between platforms supporting the first and second object cache.

3. The system of claim 1, wherein the first object cache is instantiated in a cache appliance.

4. The system of claim 1, wherein the first object cache is instantiated as a thin client executing on a computer platform.

5. The system of claim 1, wherein the second object cache is instantiated in a cache appliance.

6. The system of claim 1, wherein the second object cache is instantiated as a thin client executing on a computer platform.

7. The system of claim 1, wherein the policy-based decisions are based on one or more of configured policy information, heuristics or other algorithms.

8. The system of claim 1, wherein the policy-based decisions include decisions concerning what information is or is not cached at the reciprocal byte cache layers.

9. The system of claim 1, wherein the policy-based decisions include decisions concerning personally identifying information of a user.

10. The system of claim 1, wherein the reciprocal byte cache layers are to compress and decompress contents of at least one of the object caches.

11. The system of claim 1, wherein the reciprocal byte cache layers include a thinning mechanism that removes less popular data stored in the reciprocal byte cache layers over time.

12. The system of claim 1, wherein the reciprocal byte cache layers are to store byte patterns of only less than a threshold size.

13. The system of claim 1, wherein the first object cache is to store data transmitted from a client to a server during a write operation.

14. The system of claim 1, further comprising:
 caching an identical stream to a new stream cached at the reciprocal byte cache layer of the first apparatus on the reciprocal byte cache layer of the second apparatus.

\* \* \* \* \*